Jan. 11, 1949.　　B. M. HYMAN ET AL　　2,458,782
TRACTOR-MOUNTED CORN PICKER
Filed April 11, 1942　　　　　　　　　　　　5 Sheets-Sheet 1
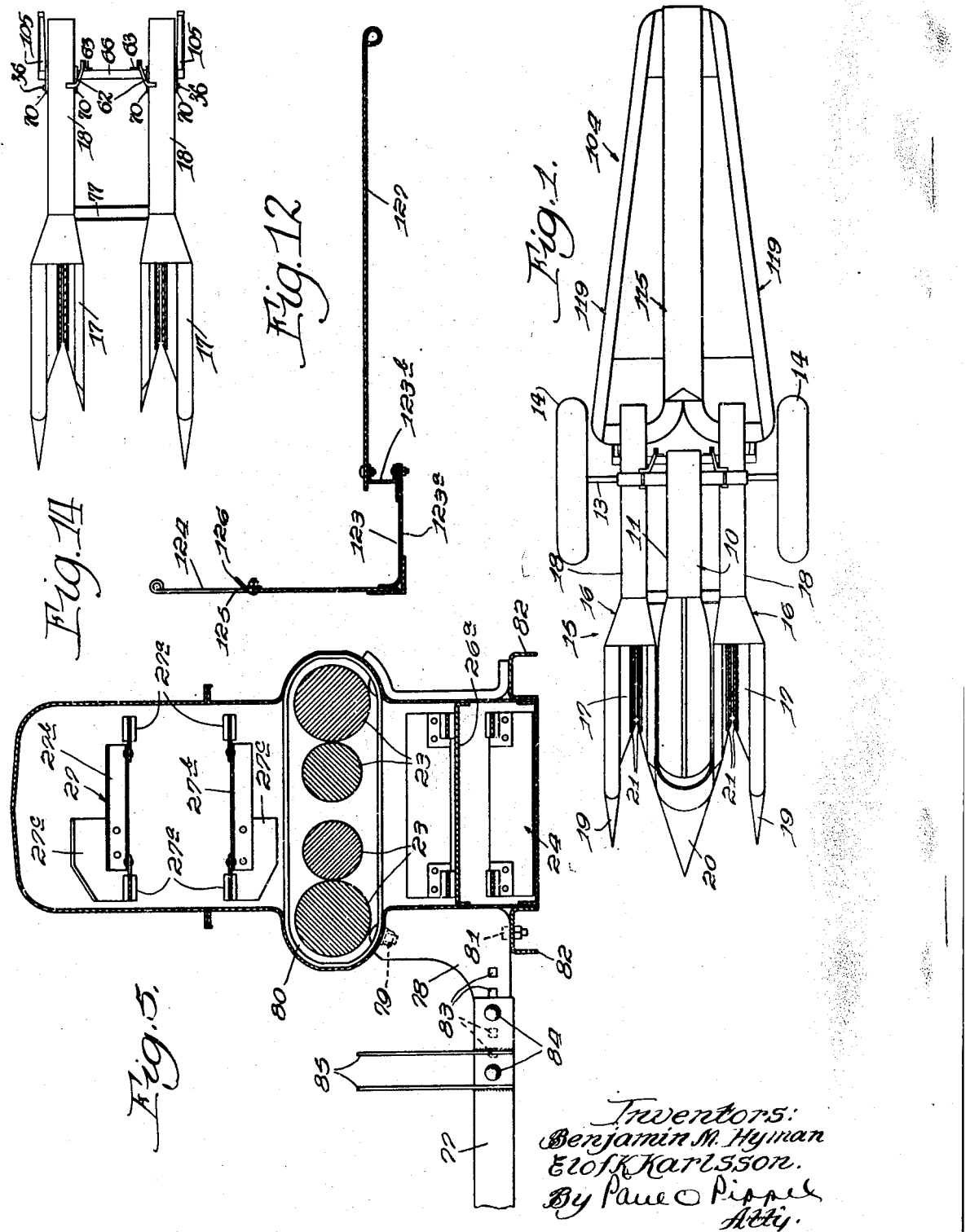
Inventors:
Benjamin M. Hyman
Elof K. Karlsson.
By Paul O. Pippel
Atty.

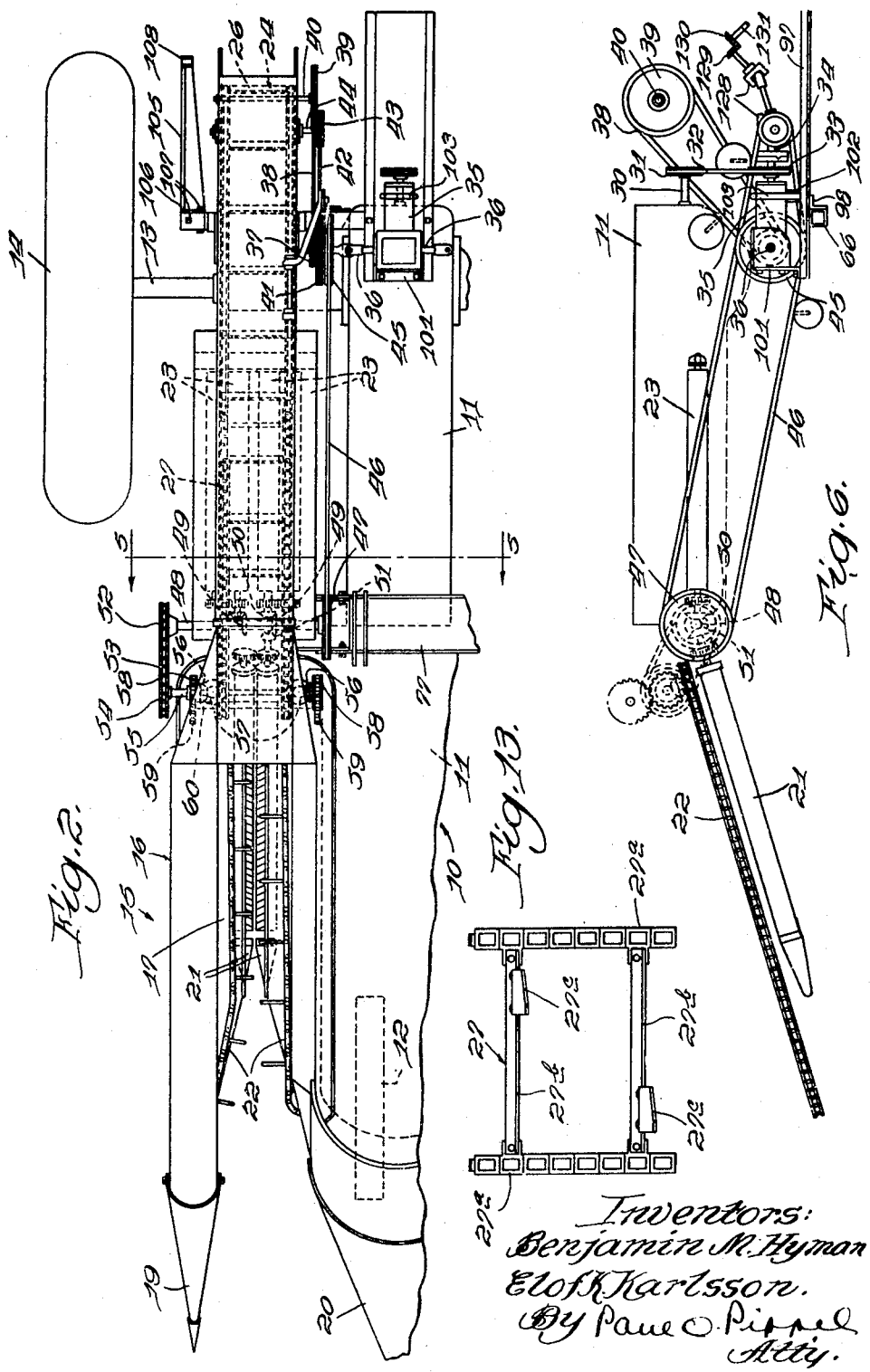

Jan. 11, 1949.  B. M. HYMAN ET AL  2,458,782
TRACTOR-MOUNTED CORN PICKER
Filed April 11, 1942  5 Sheets-Sheet 3
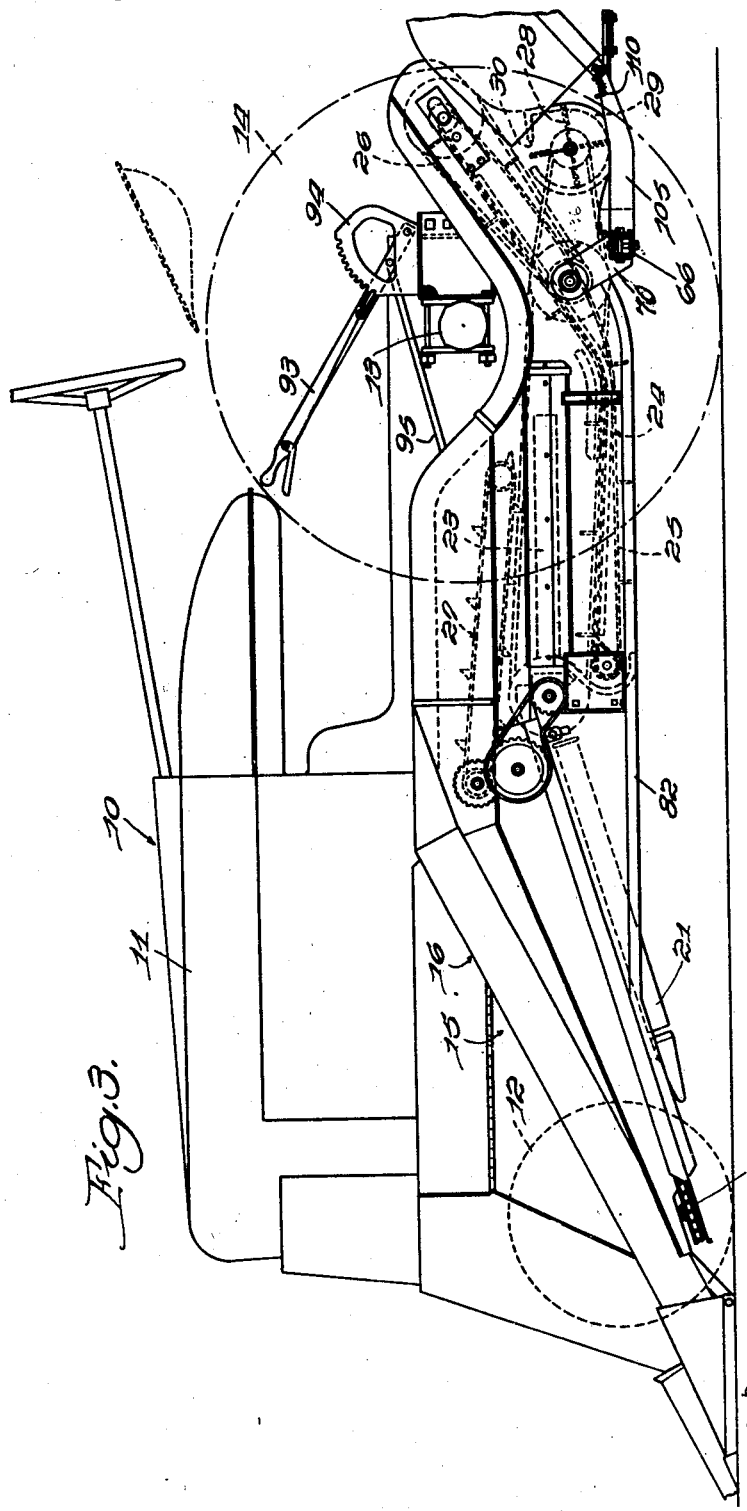
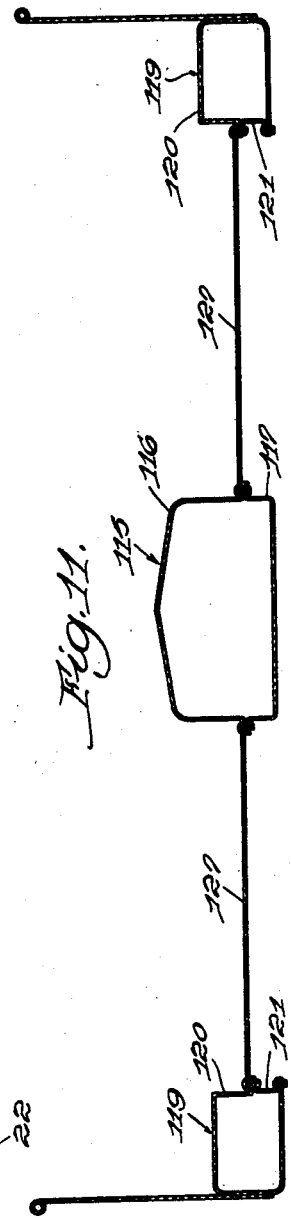
Inventors:
Benjamin M. Hyman
Elof K. Karlsson
By Paul O. Pippel
Atty.

Jan. 11, 1949.                B. M. HYMAN ET AL                2,458,782
                          TRACTOR-MOUNTED CORN PICKER
Filed April 11, 1942                                      5 Sheets-Sheet 4
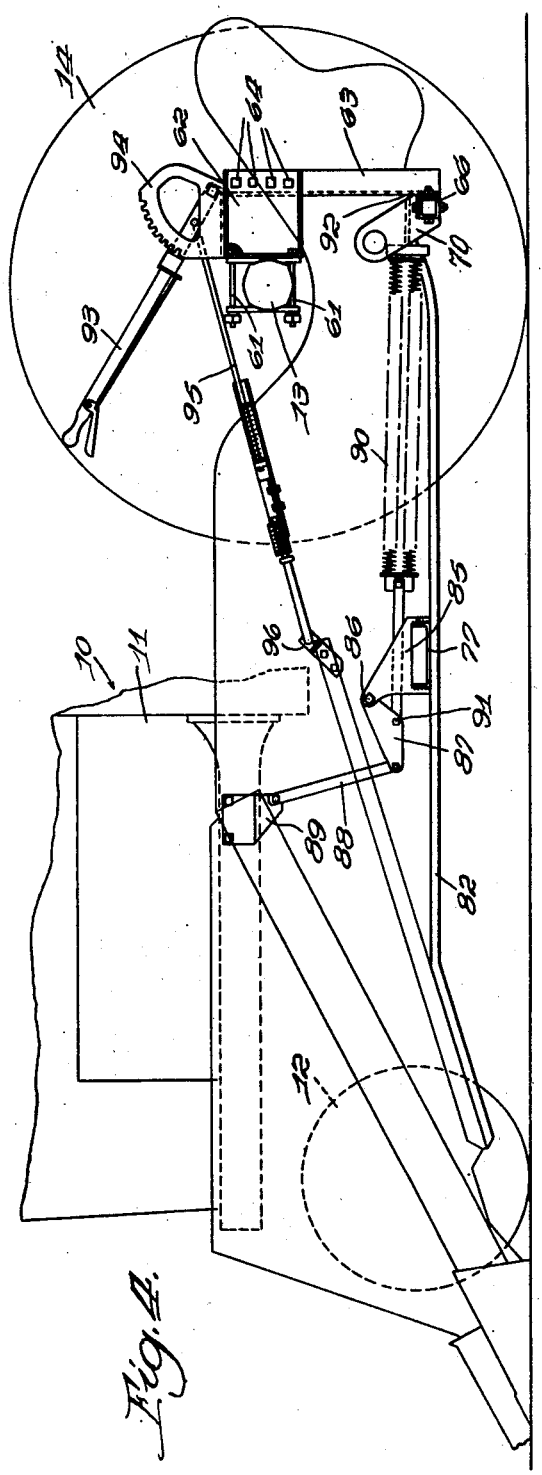
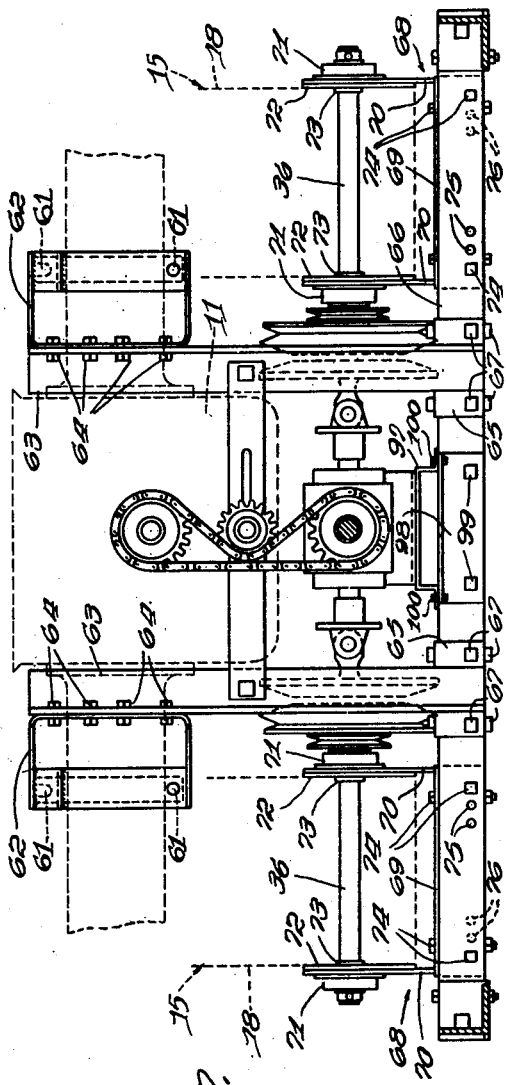
Inventors:
Benjamin M. Hyman
Eloff Karlsson.
By Paul O. Pippel
    Atty.

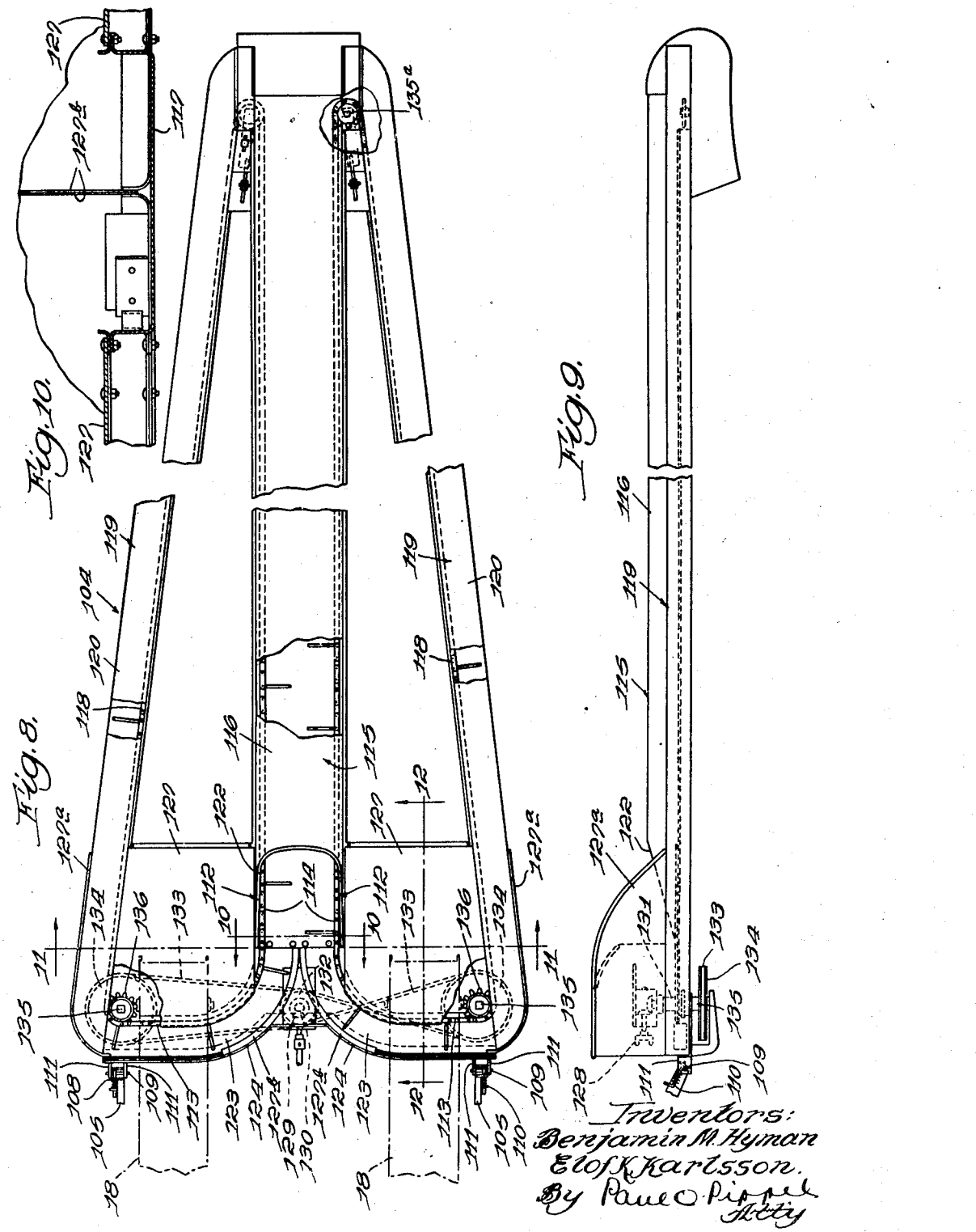

Patented Jan. 11, 1949

2,458,782

UNITED STATES PATENT OFFICE 2,458,782

TRACTOR-MOUNTED CORN PICKER

Benjamin M. Hyman and Elof K. Karlsson, Moline, Ill., assignors to International Harvester Company, a corporation of New Jersey Application April 11, 1942, Serial No. 438,582

3 Claims. (Cl. 56—18)

This invention relates to a harvester. More specifically it relates to a tractor-mounted corn picker.

Tractor-mounted corn pickers in which corn is conveyed over the rear axle of the tractor by rolls or by conveyors may be somewhat difficult to remove from the tractors. Tractor-mounted corn pickers in which various mechanisms, such as rolls and conveyors, are at a level below the tractor axle and extend beneath the tractor axle may be more easily removed from the tractor. The corn picker of the present invention is of the latter type.

An object of the present invention is to provide an improved harvester.

A further object is the provision of an improved corn picker.

Another object is to provide an improved tractor-mounted harvester.

Still another object is the provision of a tractor-mounted harvester in which various mechanisms extend beneath the rear axle of the tractor.

According to the present invention, a corn harvester comprising two picking units is mounted upon a tractor with the picking units at opposite sides thereof and extending beneath the rear axle. The picking units are pivotally mounted upon a transverse member secured behind and to the tractor axle. A wagon elevator is mounted upon the transverse member and includes two conveyor loops which convey corn ears from the picking units to the tractor center line and along the center line to a wagon connected at the rear of the tractor.

In the drawings:

Figure 1 is a plan view showing the novel corn picker of the present invention mounted upon a tractor;

Figure 2 is a plan view showing a single picking unit of the novel corn picker and the half of the tractor upon which the picking unit is mounted;

Figure 3 is a side view with parts removed showing the corn picker and the tractor;

Figure 4 is a schematic side view showing the means by which the corn picker is mounted upon the tractor;

Figure 5 is a sectional view taken along the lines 5—5 of Figure 2;

Figure 6 is a schematic side view showing the driving means for the corn picker;

Figure 7 is a rear view with parts removed showing the supporting means and the driving means for the corn picker;

Figure 8 is a plan view of the novel wagon elevator used with the corn picker of the present invention;

Figure 9 is a side view of the wagon elevator;

Figure 10 is a sectional view taken along the lines 10—10 of Figure 8;

Figure 11 is a sectional view taken along the lines 11—11 of Figure 8;

Figure 12 is a sectional view taken along the lines 12—12 of Figure 8;

Figure 13 is a detail view showing an ear forwarder; and

Figure 14 shows the corn picker detached from the tractor.

The reference character 10 designates a tractor which includes a narrow longitudinally extending body 11, a narrow front truck 12, a transversely extending rear axle 13, and rear wheels 14 at the ends of the axle 13. Upon the tractor 10 is mounted a corn harvester designated generally by the reference character 15. The corn harvester comprises two picking units 16, one at each side of the tractor body 11 and each comprising a snapping unit 17 and husking unit 18. Gather points 19 are connected to the front of the snapping units 17, and a central gather point 20 embraces the front of the tractor body 11. Each snapping unit includes a pair of snapping rolls 21 and a pair of gather chains 22. Each husking unit 18 includes two sets of husking rolls 23, shown in section in Figure 5 and in plan in Figure 2. Each husking unit also includes an elevating conveyor 24 which has a generally horizontal portion 25 extending beneath the husking rolls 23 and an inclined portion 26 extending upwardly beneath the tractor axle 13 to a point to the rear of the axle. A bottom 26a formed of a sheet-metal member is positioned immediately beneath the top flight of the conveyor so that husked corn and shelled corn may be moved along it by the conveyor. An ear forwarder 27 is positioned over the husking rolls 23 and over the rear end of the snapping rolls 21 so as to bridge the gap between the snapping rolls and the husking rolls. As shown in Figure 13, the ear forwarder 27 comprises chain links 27a adapted to engage driving sprockets, interconnecting angle members 27b, and rubber flaps 27c secured to the angle members. A fan 28 is positioned beneath the inclined portion 26 of the conveyor 25 within a casing 29 having an opening 30 through which a blast of air may be directed upwardly and rearwardly beyond the rear end of the conveyor 25.

The picking units just described are driven by means shown in Figure 6. A power take-off shaft 30 extends from the rear of the tractor body 11 and carries a pulley 31 which drives a belt 32 in turn driving a pulley 33 mounted upon a shaft 34 extending into a gear box 35. A shaft 36 extends transversely from each side of the gear box 35 to a picking unit 16. A pulley 37 mounted upon the shaft 36 drives a belt 38 in turn driving a pulley 39 mounted upon a shaft 40 driving the elevating conveyor 24 at its rear end. A pulley 41 mounted upon the shaft 36 drives a belt 42 in turn driving a pulley 43 mounted upon a shaft 44 driving the fan 28. A pulley 45 mounted upon the shaft 36 drives a belt 46 extending forwardly and driving a pulley 47 mounted upon a shaft 48. The shaft 48 carries bevel gears 49 which engage bevel gears 50 driving the sets of husking rolls 23. A bevel gear 51 engages one bevel gear 49 so as to transmit drive to the snapping rolls 21. One end of the shaft 48 carries a sprocket 52 driving a sprocket chain 53 in turn driving a sprocket 54 mounted upon a shaft 55. The shaft 55 carries bevel gears 56 which drive bevel gears 57 in turn driving gather chains 22. The shaft 55 also carries gears 58 which drive gears 59 mounted upon a shaft 60 driving the ear forwarder 27.

The picker units are carried upon the tractor by means best shown in Figures 2, 4, and 7. Channel members 62 are secured by means of bolts 61 to the rear axle 13 at points generally adjacent the tractor body 11 and generally over the inner sides of the picking units 16, as shown in Figure 7. Vertically extending angle members 63 are secured to the channel members 62 by bolts and nuts 64. Short angle members 65 are secured, as by welding or soldering, to the lower ends of angle members 63. A tube 66 of square section is secured to the angle members 65 by bolts and nuts 67. The angle members 65 contact the top and rear sides of the square tube 66, and the bolts 67 extend vertically and transversely through the square tube 66. Adjacent each end of the tube 66 is a bracket 68 formed of an angle member 69, which embraces the top and front sides of the square tube 66, and uprights 70 extending forwardly and upwardly from the tube 66 and being secured to the angle members 69 as by soldering or welding. Each upright 70 carries a bearing box 71 in which is rotatably mounted a shaft 36. Reinforcing plates 72, forming parts of the sides of the husking units 18, are pivotally supported upon portions of the bearing box 71 indicated at 73. The plates 72 of the sides of the husking units are indicated in full lines, and the husking units are otherwise indicated. Each bracket 68 is secured by its angle member 69 to the square tube 66, transverse and vertical bolts and nuts 74 passing through the tube 66. It will be seen that adjacent the inner end of each bracket 68 there is a pair of holes 75. Thus, the transverse bolts shown at the inner ends of the brackets 68 may be shifted from the position shown to one of the holes 75 for lateral adjustment of the brackets 68 upon the square tube 66. When the brackets 68 are thus shifted outwardly, the bolts 74 at the outer ends of the bracket 68 may extend through one of pairs of openings 76 in the angle members 69. Mid-points of the picker units 16 are supported upon a channel member 77 extending transversely of and beneath the tractor body, as shown in Figures 4 and 5. As shown in Figure 5, each end of the channel member 77 carries a fabricated sheet metal member 78 which is bolted, as at 79, to a casting 80 supporting the front ends of the husking rolls 23. The member 78 is also bolted, as at 81, to one of two channel stiffening members 82 extending along the base of the picking units. In accordance with the adjustment of the picking units transversely by means of a shifting of the brackets 68 along the square tube 66 as previously described, the fabricated members 78 may also be shifted with respect to the channel member 77. Each fabricated member has a plurality of holes 83 through which bolts 84 pass for securement of the members 78 to the channel members 77. Each end of the channel members 77 is carried by a pair of spaced elements 85 welded or soldered to the channel member and having pivotally connected between them by means of a bolt 86 a plate 87. Each plate 87 is connected by a link 88 to a part 89 secured to a side of the tractor body 11. A counter-balancing spring device 90 is connected at one end, as at 91, to the plate 87 and at the other end to one vertically extending channel member 63, as at 92. Adjustment of the picking units 16 about the bearing boxes 71, or in effect about the axis of the shafts 36, is accomplished by a detent lever 93 fixable to a dentate member 94 and connected by means of an extensible link 95 to a part 96 secured to one of the picking units 16. As shown in Figures 6 and 7, the square tube 66 also supports a shallow channel member 97 extending generally along the longitudinal center line of the tractor. The channel member 97 is secured to the tube 66 by an angle member 98 secured to the tube 66 by bolts 99 and to the channel member 97 by bolts 100. One end of the gear box 35 is supported on the channel member by a bracket 101 secured to the channel member. The other end of the gear box 35 is supported on tubular sections 102 resting upon the channel member 97. A U-bolt 103 embraces the end of the gear box 35, passes through the tubular sections 102, and secures that end of the gear box. A wagon, not shown, may be connected to the rear end of the channel member 97.

Figure 14 shows the corn picker of the present invention detached from the tractor. The corn picker in detached position includes, beside the spaced picking units 16 each comprising a snapping unit 17 and a husking unit 18, the channel member 77 which ties the picking units 16 together at their mid-points and the means pivotally supporting the picking units on the tractor axle 13, namely, the transverse tube 66, vertical angles 63, members 62 attachable to the rear axle 13, and brackets 70 pivotally supporting the picking units 16 on the transverse tube 66 for pivotal movement about the shafts 36 as an axis. Also attached to the transverse tube 66 in detached position of the corn picker are rearwardly extending angles 105 which normally support the wagon elevator 104 but have no function in the detached picker of Figure 14 since the wagon elevator 104 has been removed therefrom.

The picking units 16 and the channel 77 connecting them constitute a rigid unit pivotally connected to the supporting means about the axis of the shafts 36. When the supporting means is removed, the rigid unit left, composed of beam 77 and picking units 16, is free and open at the rear and unobstructed by bracing.

A corn picker of the present invention also includes a wagon elevator 104 for transferring corn ears from the husking units 18 to the wagon. The wagon elevator is supported upon angle members 105 extending rearwardly from the outer ends of the square tube 66. Each angle member 105 includes an angle portion 106 engaging the rear and bottom sides of the tube 66 and secured thereto by transverse and vertical bolts 107. The rear end of the angle members 105 is formed as a bearing 108 in which is carried a pin 109 releasably held by means 110. Upon the pin 109 rest spaced parts 111 projecting from the forward end of the wagon elevator 104. As will be seen from Figure 8, the wagon elevator 104 comprises essentially two conveyor loops 112, each of which has a transversely extending first portion 113 extending from a first point at the rear of one picker unit to a second point adjacent the longitudinal centerline of the tractor and a longitudinally extending second portion 114 extending rearwardly from the second point and upwardly along the longitudinal centerline of the tractor to a third point rearwardly of the tractor. The longitudinally extending portions 114 pass through and along opposite sides of a central tubular housing 115 formed, as indicated in Figure 11, of channel sections 116 and 117. Each conveyor loop 112 includes, in addition to the transverse portion 113 and longitudinally extending third portion 114, a diagonally extending portion 118 extending from said third point back to the first point at the rear of the corresponding picker unit which passes through a housing 119 formed, as indicated in Figure 11, of a section 120 and a narrow channel section 121 closing the opening in the section 120. The forward end of the channel section 116 is cut on a slope, as indicated at 122, so that the housing 115 is open at its forward end and exposes the longitudinal portions 114 of the conveyor loops 112. The transverse portions 113 of the conveyor loops are also exposed, being carried in channels 123. As indicated in Figures 9 and 12, each of the channels 123 comprise a member 123a forming one side and a bottom, and a channel member 123b forming the other side. A sheet 124 is secured to the member 123a as an extension to the one side. An angle member 124a reenforces the joint of the members 123a and 124. The sheets 124 are cut out at 125 (Figure 12) for reception of the very rear ends of the picking units 16, as shown in Figure 3. The horizontal edges of the cut out portions 125 carry a rubber member 126 acting as a seal upon contact with the rear end of the picking unit 16. Extending between the central housing 115 and the upper housings 119 at their forward ends are sheets 127. Side members 127a extend from the sheets 124 as continuations thereof along the housings 119 as far as the sheets 127 extend. Members 127b extend from the sheets 124 toward one another into tangential contact. The sheets 124 and 127 and members 127a and 127b cooperate to form hoppers for the reception of corn ears as they are delivered from the elevating conveyors 26 of the housing units 18.

The channels 123 form the base portion of a triangular frame work which includes the rearwardly extending housings 119 which form an apex. The third tubular section 115 extends from a midpoint at the base of the triangular frame work to the apex thereof.

The conveyor loops 112 of the wagon elevator 104 are driven from the shaft 34. As seen in Figure 6, the shaft 34 is connected through universal joints 128 to a bevel gear 129 meshing with the bevel gear 130. The bevel gear 130 is carried on a shaft 131, the lower end of which carries pulleys 132. Belts 133 connect the pulleys 132 and pulleys 134 mounted upon shafts 135 positioned at the sides of the wagon elevator 104. Sprockets 136 upon the shafts 135 drive the conveyor loops 112.

As best shown by the broken away section at the right end of Figure 8, the conveyor chains 114 and 118 at the rearward ends where they join together pass over a supporting sprocket 135a. This sprocket together with the corresponding sprocket 136 carry the conveyor structure within the surrounding structure in which the conveyor operates.

In operation, the tractor 10 is driven through a field of corn with adjacent rows of corn passing between the sets of snapping rolls 21. Corn ears are snapped by the rolls 21 and pass upwardly therealong with the aid of the gather chains 22 and are delivered from the rear end of the snapping rolls 21 to the husking rolls 23 by aid of the ear forwarder belt 27. The belt 27 also serves to move the ears rearwardly along the husking rolls 23 which husk them. The husking ears pass from the rear end of the husking rolls to the conveyor 26 and are moved upwardly beneath the rear axle to the rear thereof and are dumped into the wagon elevator. Transverse portions 113 of the conveyor loops 112 move the ears transversely to the center line of the tractor, and thence the ears are moved upwardly and rearwardly along the tractor center line by portions 114 of the conveyor loops 112 and are dumped into the wagon pulley by the channel member 97. The part of the bottom 26a beneath the horizontal portion 26 of the elevating conveyor 24 catches the corn which is shelled by the husking rolls 23 and cooperates with the conveyor 24 to dump it into the wagon elevator 104 along with the ears of corn. The fan 28 of the husking unit 18 directs a blast of air through the opening 30 in the housing 29 rearwardly through a stream of corn ears and shelled corn as it falls from the elevating conveyor 26 into the wagon elevator 104 and thus removes husks and trash from the corn.

Since the husking units 18 pass beneath the tractor axle 13, the picking units may be removed from the tractor with comparative ease, since the units need be lowered to the ground only a short distance upon detachment from the tractor. The wagon elevator 104 is not only believed to be new as a conveying means, but is also novel in relation to the particular picking units with which it is used. Since the picking units extend beneath the tractor axle, the corn ears are discharged from the units at a lower level than they would be if the units extended over the axle. Thus, it would be difficult to move the ears transversely from the ends of the picking units to the longitudinal center line of the tractor for conveying to the wagon, by means of ordinary gravity chutes. Consequently, a positive conveying means for moving the corn transversely is of great advantage, and a transverse conveying means for moving ears from the picking units to the tractor center line and a longitudinal conveying means for moving ears along the longitudinal center line to the wagon are combined in one in the conveying loops 112 forming the essential parts of the novel wagon elevator 104.

It will be apparent from the foregoing description that a new and novel harvester construction has been provided. The construction involves tractor-mounted picking units extending beneath the tractor axle, and the particular novel arrangement of parts shown and described is new. This includes the use of a conveyor extending horizontally beneath the husking rolls and diagonally upwardly from the rear thereof as a husked-conveyor and also as a shelled corn saver and conveyor, and also the use of a transverse member such as the tube 66 carried by and to the rear and below the tractor axle for support of the picking units. By use of this transverse member, picking units extending beneath the tractor axle may be adjusted laterally with respect to one another and with respect to the tractor for corn rows of various spacings. The transverse member or tube 66, the channel members 62, and the vertical members 63 may be considered to constitute means which is secured to the tractor rear axle at points generally adjacent the tractor body and generally over the inner sides of the picking units to transmit load to the rear axle at these points and extends outwardly as far as the outer sides of the picking units to provide pivotal mountings in the uprights 70 for the outer sides of the picking units in addition to the inner sides thereof. It is believed also that the use of the fan in the position shown is novel.

The intention is to limit the invention only within the scope of the appended claims.

What is claimed is:

1. In combination, a tractor having a rear axle, a picker unit extending along one side of the tractor and entirely beneath the rear axle, and means mounting the picker unit on the tractor for pivotal movement of adjustment with respect thereto, comprising a member positioned parallel to and generally below the rear axle and below the portion of the picking unit extending thereunder, means attaching the member to the axle against movement of the member with respect thereto, brackets positioned on the transverse member, means pivotally mounting the picker unit on the brackets, and means for securing each bracket in a plurality of positions spaced along the length of the transverse member for lateral adjustment of the picker unit with respect to the tractor.

2. In combination, a tractor having a rear axle, picker units positioned at opposite sides of the tractor and extending entirely beneath the rear axle, a transverse member extending parallel to and spaced from the rear axle and below the portion of the picking unit extending thereunder, means securing the transverse member to the axle, means mounting the picker units on the transverse member for pivotal movement of adjustment with respect to the tractor, said units extending between the axle and said member, and means for adjusting the position of the last-mentioned means along the length of the transverse member for lateral adjustment of the picker units with respect to one another and with respect to the tractor.

3. In combination, a tractor having a rear axle, a picker unit positioned at opposite sides of the tractor and extending entirely beneath the rear axle, a transverse member extending parallel to and spaced from the rear axle and below the portion of the picking unit extending thereunder, means securing the transverse member to the axle, means mounting the picker unit on the transverse member for pivotal movement of adjustment with respect to the tractor, and means for adjusting the position of the last-mentioned means along the length of the transverse member for lateral adjustment of the picker unit with respect to the tractor.

BENJAMIN M. HYMAN.
ELOF K. KARLSSON.

REFERENCES CITED

The following references are of record in the file of this patent:

UNITED STATES PATENTS

| Number | Name | Date |
|---|---|---|
| 484,808 | Morral | Oct. 25, 1892 |
| 1,017,783 | Merwin | Feb. 20, 1912 |
| 1,596,830 | Haase | Aug. 17, 1926 |
| 1,647,793 | Schuld | Nov. 1, 1927 |
| 1,908,952 | Brown | May 16, 1933 |
| 1,991,887 | Elmer | Feb. 19, 1935 |
| 2,255,168 | Hyman et al. | Sept. 9, 1941 |
| 2,259,893 | Hyman | Oct. 21, 1941 |
| 2,264,565 | Coultas et al. | Dec. 2, 1941 |
| 2,293,757 | Jochumsen | Aug. 25, 1942 |